United States Patent [19]

Gruber et al.

[11] 4,025,579

[45] May 24, 1977

[54] PROCESS FOR THE PRODUCTION OF SHEET-LIKE STRUCTURES

[75] Inventors: Hermann Gruber, Leverkusen; Alois Fehlbier, Burscheid; Hans-Dieter Ruprecht, Cologne, all of Germany

[73] Assignee: Bayer Aktiengesellschaft, Leverkusen, Germany

[22] Filed: Sept. 23, 1975

[21] Appl. No.: 616,102

[30] Foreign Application Priority Data

Oct. 5, 1974 Germany ............... 24476253

[52] U.S. Cl. .................. 260/858; 260/77.5 AT; 260/77.5 R
[51] Int. Cl.$^2$ .................................. C08L 75/00
[58] Field of Search ......... 260/77.5 AT, 77.5 R, 260/858; 428/425

[56] References Cited
UNITED STATES PATENTS

| | | |
|---|---|---|
| 3,344,162 | 9/1967 | Rowton ............... 260/77.5 AT X |
| 3,874,904 | 4/1975 | Orsini et al. ............ 428/425 X |

Primary Examiner—Lewis T. Jacobs
Attorney, Agent, or Firm—Gene Harsh; Lawrence S. Pope; Frederick H. Colen

[57] ABSTRACT

The present invention relates to a process for preparing elastic laminates by admixing elastomeric granules with a moisture hardenable polyurethane binder and hardening the binder. The binder is formulated to have a workable viscosity at room temperature and to avoid crystallization at temperatures above about 0° C. The binder is the reaction product of polyisocyanates of the diphenyl methane series having at least 20 wt. % of 2,4'-diisocyanatodiphenyl methane and di- and/or trihydroxy polyethers.

The invention also relates to the binder composition itself and a process for preparing it. The binder has a viscosity of about 1000 to 15,000 cP at 20° C and an NCO content of about 5 to 15 wt. %. It is prepared at an NCO to OH ratio of about 2:1 to 15:1 and at about 15° to 100° C.

6 Claims, No Drawings

PROCESS FOR THE PRODUCTION OF SHEET-LIKE STRUCTURES

BACKGROUND OF THE INVENTION

The production of elastic laminates from particles of rubber or synthetic resin, using suitable binders or adhesives, is known. Water-permeable, resilient floor coverings for sportsground have been described in German Auslegeschrift No. 1,534,345, but the chemical composition of the binder used is not disclosed. The use of two-component polyurethane binders for binding elastic particles has been described in German Auslegeschrift No. 1,955,267 and in German Offenlegungsschrift Nos. 1,720,059; 2,156,255 and 2,215,893. Moisture hardening one-component polyurethane binders for this field (German Offenlegungsschrift Nos. 2,021,682 and 2,228,111) and for the production of synthetic resin concrete (German Offenlegungsschrift No. 1,931,053) are also known.

The known two-component polyurethane binders are obtained by mixing a polyisocyanate with a polyhydroxyl compound, the two components reacting together in known manner. The polyisocyanate in addition reacts with the moisture from the atmosphere. The proportions in which the two reactions take place depend, among other things, on the atmospheric humidity which affects the properties of the hardened binder in a way which cannot be controlled. This disadvantage is obviated by using one-component polyurethane binders which are hardened only by their reaction with the atmospheric moisture. They consist of prepolymers which contain isocyanate groups and which are obtained from polyhydroxyl compounds and an excess of polyisocyanates. The known one-component polyurethane binders, however, have various disadvantages depending on their chemical structure. Prepolymers based on diphenylmethane-4,4'-diisocyanate crystallize at temperatures around freezing point or above and, therefore, cannot be stored outdoors in cold weather. The subsequent remelting which would be required involves additional expense and may also bring about a chemical change in the prepolymer due to the heat applied. Prepolymers based on commercial diphenylmethane diisocyanate (polyphenyl-polymethylenepolyisocyanate) which contains triisocyanates and tetraisocyanates as well as higher functional polyisocyanates of the diphenyl methane series have only a slight tendency to crystallization, but on the other hand their viscosity at room temperature is so high that they are difficult or impossible to process into laminates. In addition, laminates produced in this way have such great hardness and low elongation at break that they cannot be used as coverings for sportsgrounds. Although the tendency to crystallization and the viscosity may be reduced by the addition of low boiling solvents, there is then the risk that the elastic particles may swell due to the absorption of solvents. The solvents are subsequently released in the hardening process so that shrinkage occurs in the elastic layer.

If any arbitrary mixture of tolylene-2,4- and -2,6-diisocyanate is used for preparing the prepolymers, the prepolymers have a relatively high isocyanate vapor pressure at room temperature on account of their free monomeric diisocyanate content. This is physiologically harmful when the prepolymers are being worked-up. On the other hand, removal of the unreacted monomeric diisocyanate involves complicated operations, such as thin layer distillation, quite apart from the fact that NCO prepolymers obtained in this way which are free from monomers have such a high viscosity that they would generally be unusable for the purpose described here. The same applies to the use of hexamethylene-1,6-diisocyanate, but this has the added disadvantage of the relatively low strength of the hardened binder.

It is an object of this invention to obviate the above-described disadvantages of known polyurethane binders.

SUMMARY OF THE INVENTION

This problem is solved by the process according to the invention. It was found that low viscosity, solvent-free, non-crystallizing isocyanate prepolymers which are eminently suitable for use in elastic laminates are obtained if from about 20 to 80% by weight of the polyphenylpolymethylenepoly-isocyanate used as starting material consists of diphenylmethane -2,4-diisocyanate.

This invention, therefore, relates to a process for the production of elastic laminates, in which a polyurethane binder which is based on hydroxyl polyethers and polyisocyanates and which is hardened by moisture is mixed with rubber granulates and/or granulates of elastomeric synthetic resins and optionally other auxiliary agents and additives and the mixture is hardened with water after it has been shaped, characterized in that the mositure hardening polyurethane binder based on hydroxyl polyethers and polyisocyanates used is a reaction product which contains free isocyanate groups and has been obtained by reacting the said components at an NCO/OH ratio of from 2:1 to 15:1 from 20 to 80% by weight of the polyisocyanate component consisting of 2,4'-diisocyanate diphenylmethane.

DETAILED DESCRIPTION OF THE INVENTION

The binders used in the process according to the invention are prepolymers which contain free isocyanate groups mixed with isocyanates which are free from urethane groups, the said mixtures having been obtained by reacting polyisocyanates with polyhydroxyl polyethers at an NCO/OH ratio of from about 2:1 to 15:1 preferably from about 4:1 to 10:1.

The polyisocyanates may be those obtained in known manner by aniline-formaldehyde condensation followed by phosgenation. The mixture of polyphenylpolymethylene polyisocyanates obtained from this reaction consists substantially of diphenylmethane-4,4'- and 2,4'-diisocyanate and of tri- and tetraisocyanates and higher functional polyisocyanates of the diphenylmethane series. 2,4'-diisocyanatodiphenylmethane may easily be obtained in a more highly concentrated form by fractional distillation of the phosgenation product. This more highly concentrated form should be understood to be a mixture of 2,4'-diisocyanatodiphenylmethane with from about 10 to 80% by weight, preferably from about 30 to 70% by weight of 4,4'-diisocyanatodiphenylmethane and from about 0 to 5% by weight of 2,2'-diisocyanatodiphenylmethane. The polyisocyanate component used for preparing the NCO prepolymers which are used as binders in the process according to the invention may easily be obtained by mixing this concentrated 2,4'-diisocyanatodiphenylmethane with 4,4'- diisocyanatodiphenylmethane and/or high functional polyisocyanates of the diphenylmethane series in such proportions that the mixture contains from about 20 to 80% by weight, preferably from about 30 to 60% by weight of 2,4'-diisocyanatodiphenylmethane. On the other hand, the fraction described above may be used as such without mixing it with other components. The preferred polyisocyanates component thus consists of:

a. about 0 to 5% by weight of 2,2'-diisocyanatodiphenylmethane;
b. about 20 to 80% by weight, preferably about 30 to 70% by weight of 2,4'-diisocyanatodiphenylmethane; and
c. about 80 to 20% by weight, preferably about 70 to 30% by weight of 4,4'-diisocyanatodiphenylmethane and/or higher than difunctional polyisocyanates of the diphenylmethane series.

This preferred polyisocyanate component has a viscosity of less than about 200 cP at 20° C. Particularly preferred for the process according to the invention is a mixture of this type in which component (c) consists entirely of 4,4'-diisocyanatodiphenylmethane.

The polyhydroxypolyethers used for preparing the binders which are to be used in the process according to the invention are in particular polyethers which contain 2 to 3 hydroxyl groups and have molecular weights of from about 800 to 6000, preferably from about 1,000 to 4,000, or mixtures of such polyethers which may be obtained in known manner by chemical addition of ethylene oxide and/or propylene oxide to suitable starter molecules. When preparing the polyethers, the aforesaid alkylene oxides may also be used as mixtures or successively. Suitable starter components are, e.g. water, ethylene glycol, propylene-1,2-glycol, trimethylolpropane or glycerol.

The binders prepared from the above-mentioned components generally have an isocyanate group content of from about 5 to 15% by weight. They are prepared in known manner by reacting the components in the above-mentioned proportions at from about 15° to 100° C, preferably from about 20° to 50° C. The binders have a viscosity of from about 1,000 to 15,000 cP at 20° C.

The rubber or elastomer particles used in the process according to the invention may have any size or shape, but it is preferred to use elastic granulates of rubber or plastics waste having particle sizes of from about 0.5 to 6 mm. Such waste materials are obtained, e.g. from retreading tires and the manufacture of technical rubber or plastics articles. The particles having a preferred size of from about 0,5 to 6 mm have preferably a cube-like shape. However, fibrous particles e.g. having a thickness of from about 0,2 to about 3 mm and a length of from about 3 to about 20 mm may also be used. These fibrous particles are always at least twice as long as they are thick. It is understood, however, that the particles used in the process according to the invention are often mixtures of particles having different particle sizes which may include particles having smaller as well as particles having larger sizes than those indicated herein-before.

To prepare the mixtures used in the process according to the invention, the particles of rubber or elastomeric resin are mixed in known manner in quantities of from about 1 to 20 parts by weight, preferably from about 3 to 10 parts by weight, based on 1 part by weight of the binder, optionally with the addition of the auxiliary agents and additives mentioned below, for example, in the forced circulation mixer.

The mixture is hardened by the action of water, preferably atmospheric moisture, after it has been shaped. The hardening process may be accelerated by the addition of the conventional catalysts used in polyurethane chemistry, e.g. tertiary amines and organo-metallic compounds. Many such catalysts are recited in "Polyurethanes: Chemistry and Technology", Vol. I, pages 129-215 by Saunders and Frisch, Interscience Publishers, London, New York, 1962.

To improve the wetting of the rubber or plastics particles, a small quantity of a low boiling solvent may be added although it should be regarded as one of the particular advantages of the process according to the invention that no such solvents are necessary. Suitable solvents, if used, are those which do not contain any hydrogen atoms which are reactive with isocyanate groups, e.g. ethyl acetate, butyl acetate, acetone or xylene. Plasticizers may also be added. In addition, additives, such as pigments in powder form or pastes, inorganic fillers, such as sand, kaolin, chalk, barium sulphate or silicon dioxide, emulsifiers, flame retarding agents, age resistors and bonding agents may be used. The physical properties of the elastic layers produced according to the invention, e.g. their elasticity hardness, unit weight or permeability to water, may be varied within wide limits by varying the size, shape and nature of the rubber or plastics granulates, the binder content, the isocyanate group content of the binder, the degree of compression and the conditions under which hardening is carried out.

The elastic layers produced by the process according to the invention are preferably used as floor coverings, e.g. as sports surfaces for playing fields, running tracks and gymnasiums, for children's playgrounds and footpaths, but also as insulating layers for sound and heat insulation and damping vibrations.

For producing the sheet-like structures mentioned above, shaping is advantageously achieved by pouring the coating substance according to the invention over the surface, such as concrete, asphalt or other flooring compositions and then spreading it out and compacting it to obtain a layer of the desired thickness, which is generally from b'to 30 mm in the cases mentioned above, using the conventional machines and tools used for floor and road surfaces. On the other hand, in the process according to the invention shaping may also be carried out in optionally heated molds or presses so that after hardening with water or moisture the laminates according to the invention are obtained in the form of panels which are then laid in known manner to produce the floor or ground employed for shaping, hardening is achieved simply by the action of atmospheric moisture, preferably at room temperature. Hardening may be accelerated by spraying water over the surface or by steam treatment.

The binders used for the process according to the invention have numerous advantages over known binders of this type. Owing to the low viscosity of the binders, solvents may be dispensed with on the whole when producing the laminates. Owing to the low tendency to crystallization of the binders used according to the invention, both the binders and the coating compounds ready for use may be stored in the open even at low temperatures if atmospheric moisture is excluded. The ease with which the coating compounds according to the invention may be worked-up in the open air is largely independent of the temperature. This is particularly important in view of the fact that the elastic layers are in many cases produced direct on the building site, e.g. on a sports field. Another advantage of the binders used according to the invention is their low isocyanate vapor pressure. When isocyanates with a low vapor pressure are employed, fewer safety measures are required for the operators.

The binders used in the process according to the invention are also suitable for producing synthetic resin mortars and as isocyanate components for polyurethane sealing compounds or fillers and as lacquer raw materials.

The invention is further illustrated, but is not intended to be limited by the following examples in which all parts and percentages are by weight unless otherwise specified.

EXAMPLE 1

368 parts by weight of a mixture of 60 parts by weight of diphenylmethane-4,4'-diisocyanate and 40 percent by weight of diphenylmethane-2,4'-diisocyanate are mixed with 632 parts by weight of polypropyleneglycol (molecular weight 2,000, 1.7 percent by weight of hydroxyl groups) and the mixture is stirred for 3 hours at 60° C.

| | |
|---|---|
| NCO content: | 9.9% (calculated: 10.0%) |
| Viscosity (25° C) | 2230 cP (in the rotary viscosimeter) |
| Storage at 0° C: | no crystallization after 3 months. |

A prepolymer prepared by the same method from pure diphenylmethane-4,4'-diisocyanate has the following properties:

| | |
|---|---|
| NCO content: | 9.7% (calculated: 10.0%) |
| Viscosity (25° C): | 2720 cP (in the rotary viscosimeter) |
| Storage at 0° C: | crystallization after 24 hours. |

EXAMPLE 2

781 parts by weight of a mixture of 65 percent by weight of polyphenylpolymethylene polyisocyanate which has been obtained by phosgenating an aniline-formaldehyde condensate and the viscosity of which has been adjusted to 200 cP at 20° C by distilling off diisocyanatodiphenyl methane isomers and 35 percent by weight of diphenylmethane-2,4'- diisocyanate are heated to 60° C and 1200 parts by weight of the polyether from Example 1 are added with stirring. The mixture is then stirred for a further 3 hours at 60° C.

| | |
|---|---|
| NCO content: | 10.1% (calculated: 10.0%) |
| Viscosity (25° C): | 1100 cP (in the rotary viscosimeter). |

A prepolymer prepared in the same manner, but entirely from the above-mentioned polyphenyl-polymethylene-polyisocyanate has the following properties:

| | |
|---|---|
| NCO content: | 10.0% (calculated: 10.0%) |
| Viscosity (25° C): | 28,000 cP (in the rotary viscosimeter). |

EXAMPLE 3

160 g of the binder described in Example 1 are mixed with 0.32 g of a 33% solution of 1,4-diazabicyclooctane (catalyst for the hardening reaction of the binder) in dipropylene glycol in a polyethylene vessel. After the addition of 640 g of a granulate of tread surface rubber obtained from motor car tires and having a particle size of from 1 to 5 mm, the mixture is stirred until the rubber particles are completely wetted with binder. A frame measuring 30 = 30 = 2 cm is coated with a mold release agent and placed on a firm support covered with polyethylene foil. The mixture is introduced into this frame and spread out to a uniform height and pressed down with a smoothing tool to form a layer from 10 to 11 mm in thickness. The mixture is then hardened by atmospheric moisture at room temperature. The panel formed in this way can be removed from the frame after 15 hours. It attains its final strength at the latest after 1 week's storage at room temperature. It has the following physical properties:

| | | |
|---|---|---|
| Tensile strength: | 0.4 to 0.6 MPa | (according to DIN 53504) |
| Elongation on tearing: | 30 to 60% | (according to DIN 53504) |
| Compressive stress: | | |
| 0.5 to 0.7 MPa at 20% compression (method based on DIN 53577) | | |
| 1.5 to 2.2 MPa at 40% compression | | |
| 5.0 to 7.0 MPa at 60% compression. | | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for the production of elastic sheet-like structures, in which a polyurethane binder which hardens under the action of moisture and which is based on polyethers which contain hydroxyl groups and polyisocyanates is mixed with rubber and/or elastomeric synthetic resin granulates and optionally other auxiliary agents and additives and the mixture is hardened by water after it has been shaped, characterized in that the moisture hardening polyurethane binder based on hydroxyl polyethers and polyisocyanates used is a reaction product which has free isocyanate groups and is obtained by reacting these components at an NCO-/OH ratio of from 2:1 to 15:1 and, in that from 20 to 80% by weight of the polyisocyanate component consists of 2,4'-diisocyanatodiphenylmethane.

2. Process according to claim 1, characterized in that hardening is effected by the action of atmospheric moisture.

3. A moisture curing binder for use in forming elastic sheet like structure comprising the reaction product of
   a. a polyisocyanate component comprising
      i. about 20 to 80 wt.% of 2,4-diisocyanatodiphenylmethane,
      ii. 0 to about 5 wt.% of 2,2'-diisocyanatodiphenylmethane, and
      iii. about 80 to 20 wt.% of 4,4'-diisocyanatodiphenylmethane and greater than difunctional polyisocyanates of the diphenyl methane series,
   b. polyethers based on ethylene oxide and/or propylene oxide having i. 2 to 3 hydroxyl groups per molecule, and
ii. molecular weights of about 800 to 6,000,
c. at an NCO to OH ratio of about 2:1 to 15:1 and a reaction temperature of about 15 to 100° C,
d. said product having an NCO content of about 5 to 15 wt.% and a viscosity of about 1,000 to 15,000 cP at 20° C.

4. A process for producing a moisture curing binder which does not significantly crystallize at 0° C comprising reacting
   a. a polyisocyanate component having a viscosity of less than about 200 cP at 20° C comprising
      i. about 20 to 80 wt.% of 2,4'-diisocyanatodiphenylmethane,
      ii. 0 to about 5 wt.% of 2,2'-diisocyanatodiphenylmethane, and
      iii. about 80 to 20 wt.% of 4,4'-diisocyanatodiphenylmethane and greater than difunctional polyisocyanates of the diphenylmethane series, with
   b. polyethers based on ethylene oxide and/or propylene oxide having
      i. 2 to 3 hydroxyl groups per molecule,
      ii. molecular weights of about 800 to 6,000,
   c. at an NCO to OH ratio of about 2:1 to 15:1 and a reaction temperature of about 15° to 100° C,
   d. to produce a binder having an NCO content of about 5 to 15 wt.% and a viscosity of about 1,000 to 15,000 cP at 20° C.

5. A process for the preparation of elastic sheet-like structures comprising
   a. mixing about 1 to 20 parts by weight of rubber or synthetic elastomeric resin granules with 1 part by weight of a moisture hardenable polyurethane binder
   b. shaping the resulting mixture of (a), and
   c. curing said binder by the action of moisture,
   d. said binder being the reaction product of
      1. a polyisocyanate component having a viscosity of less than about 200 cP at 20° C comprising
         i. about 20 to 80 wt.% of 2,4'-diisocyanatodiphenylmethane,
         ii. 0 to about 5 wt.% of 2,2'-diisocyanatodiphenylmethane, and
         iii. about 80 to 20 wt.% of 4,4'-diisocyanatodiphenylmethane and greater than difunctional polyisocyanates of the diphenylmethane series, with
      2. polyethers based on ethylene oxide or propylene oxide having
         i. 2 to 3 hydroxyl groups per molecule, and
         ii. molecular weights of about 800 to 6,000,
      3. said reaction taking place at an NCO to OH ratio of about 2:1 to 15:1 and a temperature of about 15° to 100° C, and
      4. said reaction product having an NCO content of about 5 to 15 wt.% and a viscosity of about 1,000 to 15,000 cP at 20° C.

6. The process of claim 5 wherein
   a. the granules have a particle size of about 0.5 to 6 mm,
   b. about 3 to 10 parts by weight of granules are mixed with 1 part by weight of binder,
   c. the polyisocyanate component comprises
      i. about 30 to 70 wt.% of 2,4'-diisocyanatodiphenylmethane,
      ii. 0 to about 5 wt.% of 2,2'-diisocyanatodiphenylmethane, and
      iii. about 70 to 30 wt.% of 4,4'-diisocyanatodiphenylmethane,
   d. the polyethers have molecular weights of about 1,000 to 4,000, and
   e. the binder is formed at an NCO to OH ratio of about 4:1 to 10:1 and about 20° to 50° C.

* * * * *